United States Patent [19]

Dunlap

[11] Patent Number: 5,140,096
[45] Date of Patent: Aug. 18, 1992

[54] POLYMER PREPARATION FROM DIACYLBIS-LACTAM TO AVOID CRYSTAL FORMATION

[75] Inventor: Beth E. Dunlap, Richmond, Va.

[73] Assignee: E. I. Du Pont de Nemours and Company, Wilmington, Del.

[21] Appl. No.: 711,967

[22] Filed: Jun. 7, 1991

[51] Int. Cl.$^5$ .............................................. C08G 69/16
[52] U.S. Cl. .................................... 528/323; 528/183; 528/184; 528/185; 528/211; 528/324; 528/329.1; 528/367

[58] Field of Search ...................... 528/323, 324, 329.1, 528/331, 183, 184, 185, 211, 367

[56] References Cited

U.S. PATENT DOCUMENTS 3,862,262  1/1975  Hendrick et al. .................. 528/323

*Primary Examiner*—Harold D. Anderson

[57] ABSTRACT

Premelting of the bis-lactam inhibits crystal formation when reacting certain bis-lactams with certain diamine mixtures.

4 Claims, No Drawings

POLYMER PREPARATION FROM DIACYLBIS-LACTAM TO AVOID CRYSTAL FORMATION

BACKGROUND OF THE INVENTION

In copending and coassigned U.S. patent application Ser. No. 07/402,295 there is disclosed a process for preparing a certain class of polyamides. In general the process involves the reaction of a bis-lactam with one or more diamines to produce the polymers. Unfortunately, with some diamines or diamine combinations, polymers are produced which have crystals as shown by the existence of spherulites under a microscope. Pressed films of such polymer are often opaque and when attempts are made to bend the films, breakage results.

The present invention presents a processing technique which inhibits formation of crystals in preparing certain of these polyamides.

SUMMARY OF THE INVENTION

This invention provides an improved process for preparing a polymer formed by the reaction of N,N'-isophthaloyl bis-caprolactam with a mixture of m-phenylene diamine and from 10 to 50 mol % of p-phenylene diamine; a mixture of m-phenylene diamine and from 10 to 90 mol % of 4,4'-diaminodiphenyl ether or a mixture of m-phenylene diamine and from 10 to 90 mol % of 3,4'-diaminodiphenyl ether. In the improved process, the formation of crystals in the resulting polymer is inhibited by the step of melting the bis-lactam before reacting it with the mixture of diamines.

DETAILED DESCRIPTION OF THE INVENTION

The general procedure of the presently improved process is as follows:

The bis-lactam is placed in a reaction vessel as a solid and the vessel purged with nitrogen. The vessel is then heated until the bis-lactam is completely melted. The mixture of diamines is then added with vigorous stirring to provide good mixture of the reactants. The mixture is then heated to react the ingredients and form the polymer. Generally, the heating is conducted at a temperature of from 220° to 280° C. until reaction is complete.

In the examples below, heating was continued for about 2.5 to 4 hrs. In each case, the product resulting from the process of the invention was clear and showed no spherulites under the microscope at 100x magnification. Before pressing into film, the as-produced polymer was placed in hot methanol for several hours to remove residual lactam. The isolated polymer was then dried in an oven and pressed in a paper press at 300° C. for one minute, to form a clear pliable film. Example 4 is a control. It is comparable to Example 1 except for the fact that the bis-lactam was permitted to react with the diamines without premelting.

TESTS AND MEASUREMENTS

The glass transition temperature, $T_g$, of a copolymer is determined by subjecting a sample of the copolymer to a Differential Scanning Calorimeter (DSC) Test in the manner described in U.S. Pat. No. 4,501,886 to J. P. O'Brien, col. 4, lines 10-25, except that a Du Pont 2100 Thermal Analyzer was used and the transition in the range of about 180° C.-250° C. is taken as the $T_g$ of the sample of copolymer. The inherent viscosity of a polymer which is soluble in a suitable solvent is conventionally used as a measure of the degree of polymerization of the polymer and is defined as $$\eta inh = \frac{\ln(t/t_o)}{C}$$

measured by determining the flow times of a solution of the polymer at a concentration C in a capillary viscometer at a temperature of 25° C., where t is the flow time of the solution and $t_o$ is the flow time of the solvent alone. With the copolymers of the invention, the inherent viscosity values were determined using a solution of 4 wt. % lithium chloride (LiCl) in dimethylacetamide (DMAc) as the solvent, in which the copolymer sample was dissolved at a concentration of about 0.5 g of the copolymer per 100 ml of the solvent. The following examples are illustrative of this invention and are not intended as limiting.

EXAMPLE 1

In this example, a mixture of 3,4'-diaminodiphenyl ether and m-phenylene diamine was reacted with N,N'-isophthaloyl bis-caprolactam to form a polymer.

Into a glass tube was placed 5.0 g of N,N'-isophthaloyl bis-caprolactam. The tube was purged with nitrogen and sealed with a polytetrafluoroethylene lined screw cap. The tube was placed in a 4 inch high aluminum block preheated to 250° C. After the N,N'-isophthaloyl bis-caprolactam was completely melted, a mixture of 1.37 g m-phenylene diamine and 0.28 g 3,4'-diaminodiphenyl was added to the tube under nitrogen. The tube was shaken to mix the ingredients and returned to the block for 2.5 hours.

The polymer formed was clear and showed no spherulites under the microscope at 100X. A portion of the polymer was placed in hot methanol for several hours to remove residual lactam. The isolated polymer was dried in an oven and pressed in a paper press at 300° C. for one minute. A clear, pliable film resulted.

EXAMPLE 2

In this example, a mixture of m-phenylene diamine and p-phenylene diamine was reacted with N,N'-isophthaloyl bis-caprolactam to form a polymer.

The procedure is similar to that of Example 1, except that 5.0 g of N,N'-isophthaloyl bis-caprolactam, 1.06 g m-phenylene diamine and 0.46 g p-phenylene diamine were used. The mixture was heated for 4 hours.

A clear polymer was formed. No spherulites were seen under the microscope. A polymer with an inherent viscosity of 0.6 and a Tg of 196° C. was obtained.

EXAMPLE 3

In this example, a mixture of m-phenylene diamine and 4,4'-diaminodiphenyl ether was reacted with N,N'-isophthaloyl bis-caprolactam to form a polymer.

The procedure is similar to that of Example 1, except that 5.0 g of N,N'-isophthaloyl bis-caprolactam, 0.46 g m-phenylene diamine and 1.97 g 4,4'-diaminodiphenyl ether were used. The mixture was heated for 4 hours. A clear polymer was formed. No spherulites were seen under the microscope. A polymer with an inherent viscosity of 0.6 and a Tg of 190° C. was obtained.

EXAMPLE 4

Control

In this example, the same mixture of diamines as in Example 1 was reacted with N,N'-isophthaloyl bis-caprolactam to form a polymer.

Into a glass tube was placed 5.0 g of N,N'-isophthaloyl bis-caprolactam, 1.37 g of m-phenylene diamine, and 0.28 g of 3,4'-diaminodiphenyl ether. The tube was purged with nitrogen, and was sealed with a polytetrafluoroethylene lined screw cap. The tube was placed in a 4 inch high aluminum block at room temperature. The block was heated to 250° C. over a period of approximately 2 hours. The tube was shaken as melting occurred. The mixture was held at 250° C. for 2.5 hours.

An opaque polymer was formed. The polymer was filled with spherulites as observed at 100x magnification. A portion of the polymer was placed in hot methanol for several hours to remove residual lactam. The isolated polymer was dried in an oven and pressed in a paper press at 300° C. for one minute. An opaque film was formed that broke upon bending.

I claim:

1. In a process for preparing a polymer by reacting N,N'-isophthaloyl bis-caprolactam with a mixture of m-phenylene diamine and from 10 to 50 mol % of p-phenylene diamine; a mixture of m-phenylene diamine and from 10–90 mol % of 4,4'-diaminodiphenyl ether; or a mixture or m-phenylene diamine and from 10–90 mol % of 3,4'-diaminodiphenyl ether, the improvement comprising, inhibiting the formation of crystals in the resulting polymer by adding the diamine mixture to molten bis-lactam, and heating to achieve reaction.

2. A process according to claim 1 wherein the mixture of diamines is m-phenylene diamine with from 10 to 50 mol % of p-phenylene diamine.

3. A process according to claim 1 wherein the mixture of diamine is m-phenylene diamine with from 10 to 90 mol % of 4,4'-diaminodiphenyl ether.

4. A process according to claim 1 wherein the mixture of diamines is m-phenylene diamine with from 10 to 90 mol % of 3,4'-diaminodiphenyl ether.

* * * * *